United States Patent
Brown et al.

[11] Patent Number: 5,809,195
[45] Date of Patent: Sep. 15, 1998

[54] MODULAR OPTICAL FIBER RIBBON

[75] Inventors: Robert J. Brown, Buford; Kenneth Wade Jackson, Snellville; Kenneth Martin Kroupa, Roswell; Clyde Jefferson Lever, Buford; Stephanie Holland Webb, Alpharetta, all of Ga.

[73] Assignee: Lucent Technologies Inc., Murray Hill, N.J.

[21] Appl. No.: 788,781

[22] Filed: Jan. 24, 1997

Related U.S. Application Data

[63] Continuation of Ser. No. 500,070, Jul. 10, 1995, abandoned.

[51] Int. Cl.$^6$ ........................................ G02B 6/44
[52] U.S. Cl. .................................................. 385/114
[58] Field of Search ........................ 385/114, 109, 385/110, 128

[56] References Cited

U.S. PATENT DOCUMENTS

| | | | |
|---|---|---|---|
| 3,920,423 | 11/1975 | Ross | 55/103 |
| 3,920,432 | 11/1975 | Smith | 65/4 |
| 4,147,407 | 4/1979 | Eichenbaum et al. | 350/96.34 |
| 4,848,868 | 7/1989 | Rohner | 350/96.23 |
| 4,900,126 | 2/1990 | Jackson et al. | 350/46.23 |
| 5,119,464 | 6/1992 | Freychet et al. | 385/147 |
| 5,377,292 | 12/1994 | Bartling et al. | 385/128 |
| 5,379,363 | 1/1995 | Bonicel et al. | 385/114 |
| 5,446,821 | 8/1995 | Nonaka et al. | 385/128 |
| 5,485,539 | 1/1996 | Mills | 385/114 |

FOREIGN PATENT DOCUMENTS

| | | | |
|---|---|---|---|
| 1-80918 | 3/1989 | Japan | 385/114 |
| 1-180918 | 7/1989 | Japan . | |
| 2-282709 | 11/1990 | Japan | 385/114 |
| 5-109322 | 4/1993 | Japan . | |

OTHER PUBLICATIONS

ANSI Standard X3.182–1990, Sec. 6.1.
Kertscher, "Standing machines for optical fibre ribbon cables", Wire, Dec. 1994.
A Modular Ribbon Design For Increased Packing Density Of Fiber Optic Cables; International Wire & Cable Symposium Proceedings 1993, pp. 20–27.

*Primary Examiner*—Rodney B. Bovernick
*Assistant Examiner*—Hemang Sanghavi

[57] ABSTRACT

A modular optical fiber ribbon has a repetitive color identifier arrangement for the individual coated fibers defining one or more adjacent modules. Each module is identified by a digital code imprinted or otherwise marked on the top surface of the ribbon so that each individual fiber in the entire ribbon structure is uniquely identified. Each module or portion thereof can be broken out from the ribbon by means of a break-out tool which is sufficiently hard to cut the matrix bonding material which holds the fibers in the ribbon configuration, but which is not hard enough to cut the fiber coating.

14 Claims, 3 Drawing Sheets

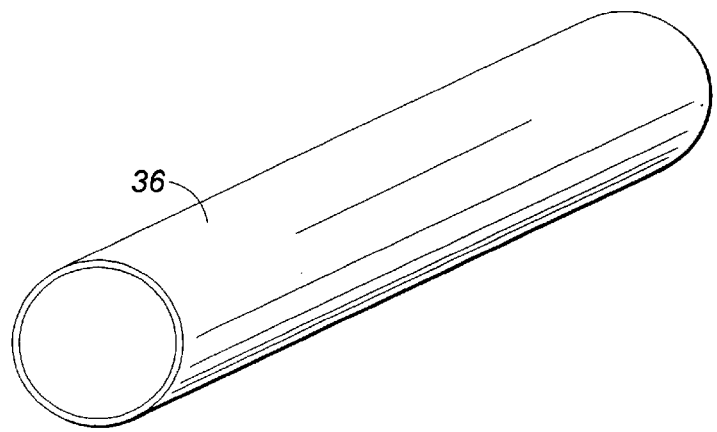
FIG. 2
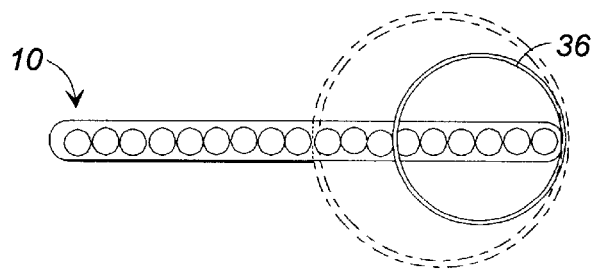
FIG. 3
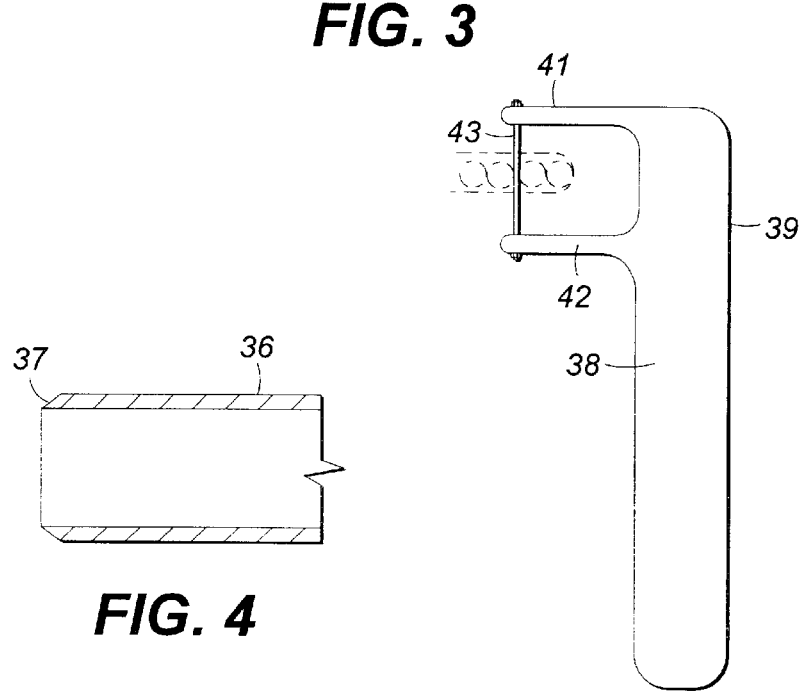
FIG. 4
FIG. 5

MODULAR OPTICAL FIBER RIBBON

This is a continuation of application Ser. No. 08/500,070, filed on Jul. 10, 1995, now abandoned.

FIELD OF INVENTION

This invention relates to a bonded array of optical fibers and, more particularly, to a modular arrangement of planar arrays or ribbons of optical fibers.

BACKGROUND OF THE INVENTION

Optical fiber cable development, wherein the cable is capable of multi-channel transmission, has led to the use of bonded arrays of fibers which form a planar ribbon, and to stacks of ribbons within a core tube or sheath. In a typical ribbon array, a plurality of fibers, e.g., twelve, are held in spaced position parallel to each other by a suitable matrix, a configuration which simplifies construction, installation, and maintenance by eliminating the need for handling individual fibers. Thus, the splicing and connecting of the individual fibers can be accomplished by splicing and connecting the much larger ribbons provided that the fiber positions in the ribbon are precisely fixed and maintained.

In the prior art, numerous ribbon arrays have been proposed, all directed at achieving the aforementioned alignment as well as being directed to other aspects of ribbon construction and geometry. Among these is the adhesive sandwich ribbon (ASR) as disclosed in U.S. Pat. No. 4,147,407 of Eichenbaum, et al. and U.S. Pat. No. 3,920,432 of Smith. Such ribbon structures have proven to be easy to manufacture, rugged, and compact, and suitable for mass splicing. However, the use of adhesive tapes to form the sandwich necessitates a slow-down in the processing speed during manufacture and in an increased cost of the finished product, as well as the added loss to the fibers.

In U.S. Pat. No. 4,900,126 of Jackson, et al., the disclosure of which is incorporated herein by reference, there is shown a bonded optical fiber ribbon which comprises a coplanar array of longitudinally extending parallel coated optical fibers in contact with each other. Each fiber is enclosed in inner and outer layers of coating materials and has a color identifier for differentiating each fiber from the other fibers. The inner layer comprises an ultra-violet light curable bonding material having a modulus of approximately 1 MPa and an outer layer of an ultra-violet light curable bonding material having a modulus of approximately 1 GPa for mechanical protection. With the fibers disposed in a parallel array, interstices are created between the fibers themselves and between the fibers and the envelope of the ribbon, which is a matrix formed of an ultra-violet light curable bonding material having a modulus that is less than the modulus of the outer coating layer on the fiber and which is greater than the modulus of the inner coating layer. The matrix material fills the interstices and bonds the fibers together and to the envelope to form a completed ribbon. The modulus of the matrix material and its bond to the color identifier are such that differential strains among fibers induced by temperature changes or mechanical loads can be relieved by minute interfiber movement and creep of the matrix material. The ribbons may be stacked such that eighteen ribbons, for example, having twelve fibers each, may be enclosed within a core tube to form the core of an optical fiber cable having two hundred and sixteen fibers, or, if preferred, channels. The core tube itself has an outside diameter (O.D.) of approximately 0.4 inches. Such an arrangement, which is in widespread use today, has proved adequate for most present day applications, but it imposes a definite upper limit on the numbers of fibers available and their individual identification and their accessibility.

There is, today, an ever-increasing demand for increased optical fiber cable capacity which is expected to continue into the foreseeable future. Higher fiber count cables and higher fiber packing densities are under constant and ongoing study and development. Extremely high fiber count cables have been proposed that use down-sized fiber coating aimed at increasing packing density, however, the long term reliability, engineering, and operational characteristics are not, as yet, fully understood. Hence, an increase in the number of fibers, and, in turn, an increase in packing density, in a standard sized cable and with fibers having the standard thickness of fiber coating, is greatly to be desired. In an article entitled "A Modular Ribbon Design For Increased Packing Density of Fiber Optical Cables" by K. W. Jackson, et al., International Wire & Cable Symposium Proceedings 1993 at pages 20 through 27, the disclosure of which is incorporated herein by reference, there are given the results of a study of the feasibility of increasing the fiber packing density in a high fiber count cable. The cable design concept disclosed therein is based upon a modular structure of the ribbons used in the cable, and it is determined that the packing density for existing cable designs can be increased by as much as thirty to fifty percent. The ribbon structure proposed in that article comprises, for example, an array of sixteen fibers in side by side contacting relationship and divided, as by color coding of the fibers, into two eight fiber modules, which in turn, can be divided into four fiber modules. Each of the ribbons to be stacked within the cable bears, on its surface, identifying alpha-numeric characters. Thus, each fiber within each module in the stack is uniquely identified by two identifiers, i.e., color and ribbon number. It has been found, however, that printing the ribbon identifying characters on the surface of the ribbons often results in smeared ink and illegible characters as a result of the speed with which the ribbon passes through the printer, as well as the small size of alphanumeric characters required to identify small fibercount subgroups. On the other hand, to achieve legibility, it is necessary to slow down the ribbon speed, thereby slowing down the production rate which, in turn, increases incremental costs. With the increased emphasis on even higher count cables and greater demand therefor, ribbon production rates are expected to increase by as much as an order of magnitude, hence, imprinting of ribbon and module identifiers must be such as to work with the increased speeds.

As pointed out in the aforementioned Jackson et al. patent, the color identifier material of each of the fibers should not be removed from the fiber when the bonding material is removed to access the fibers. Thus, the matrix material of the bonded ribbons is selected to have an interfacial bonding characteristic such that the bond interface of the matrix material to the coloring material is weaker than the bonding interface of the coloring material to the outermost coating on the optical fiber. In at least one embodiment of the invention of that patent, a release agent is applied over the coloring material prior to application of the matrix bonding material. There remains a problem, however, in breaking out separate modules from the ribbon, and individual fibers from the module. In general, when it is desired to break out one or more modules from the ribbon, and one or more fibers from the module, a matrix separating tool is used. Such a tool usually comprises a metallic blade having a cutting edge for slicing through the matrix, however, with such a tool extreme care must be exercised to avoid nicking or otherwise damaging the fiber or fibers adjacent to the cut. Where, as is the case with the ribbon of the aforementioned Jackson et al. patent, the individual fibers are in actual contact with each other, the straight cutting edge of the blade is almost certain to contact the fiber, and avoidance of damage is extremely difficult. This problem is compounded by the fact that most such "break-outs" are performed in the field, under less than ideal conditions, and the installer or splicer is forced to proceed slowly with extreme care. In addition, where, in a sixteen fiber ribbon, for example, the ribbon is divided into four modules of four fibers each, it is quite difficult to identify the line of separation between modules, and to cut along that line. Furthermore, in breaking out individual fibers, it is desirable that the installer or splicer remove all matrix material from each individual fiber, a process which can consume an inordinate amount of time and is, therefore, economically undesirable.

SUMMARY OF THE INVENTION

The present invention is, in a preferred embodiment, an optical fiber ribbon of the type disclosed in the aforementioned Jackson et al. patent, having, for example, eighteen or twenty-four optical fibers arrayed in a plane in side-by-side relationship. The eighteen fibers are divided into three modules of six fibers per module, and color coded accordingly. Thus, one module of six fibers may have a color code of, for example, blue-orange-green-brown-slate-white, and the next adjacent module repeats this color sequence, so that the three modules can be differentiated by the end colors in the color-sequence of their color codings. In one feature of the invention, the ribbon has printed on the flat surface thereof a code, preferably digital, for uniquely identifying each module and differentiating it from all other modules in the ribbon and, when the ribbons are stacked within a core tube, from all other modules in the stack. In an adaptation of a bar code, bars or indicators of two widths are used in combination to create a continuous numerical designation for all of the modules in the stack. Thus, a thin or narrow bar, e.g., which extends transversely across the module, is used to designate the numeral one, whereas a thick or wide bar, twice the width of the narrow bar, which extends transversely across the module, is used to designate the numeral five. A module having two wide bars and four narrow bars is uniquely identified as module fourteen, and the module immediately adjacent to it will have two wide bars and three narrow bars (13) or three wide bars (15). Thus, each fiber within the entire stack of, for example, eighteen ribbons, which contains three hundred and twenty-four fibers, is uniquely identified by its module designation and its color. The use of a modified bar code virtually eliminates smearing at high production speeds, and, where individual modules are narrow in width, virtually eliminates illegibility which is common with too small alpha-numeric characters.

It is to be understood that the use of ribbons having more fibers, such as twenty-four, or fewer fibers, such as twelve, is contemplated by the invention, and various different numbers of modules may be included in a ribbon. Thus, there can be four modules of six fibers each, or six modules of four fibers each, in a twenty-four fiber ribbon, with a repetitive color coding being appropriate for the number of fibers in a single module. Also, various types of codes other than those shown here might be used as long as the effect of reducing production speed is minimized.

The present invention also contemplates low loss/low stress methods for breaking out modules from the ribbon and for separating fibers from their modules even where the fibers are "live", i.e., carrying signals. As is discussed in the aforementioned Jackson et al. patent, the matrix bonding material is a curable material such as a diethylenic terminated resin plus a dilutent and a photoinitiator, where the material has a modulus greater than 1 MPa but less than 1 GPa, and is sufficiently high to provide mechanical integrity and ribbon "strippability" but not so high as to affect adversely the optical loss characteristics or the mechanical performance of the optical fibers or access to the fibers. A higher modulus material may be used as the bonding material when each optical fiber has dual coatings with the inner coating layer comprising a low modulus material.

The individual modules may be broken out from the ribbon without deleteriously affecting the ribbon integrity by means of a break-out tool which comprises a hollow cylindrical tube of a semi-rigid material such as a suitable plastic preferably harder than the matrix material, the inner diameter of which corresponds to the width of a module. The front edge of the tube is sufficiently sharp to penetrate and separate the matrix material, thus when the tube is pressed into the end of the ribbon, the matrix is separated between the last fiber in one module and the first fiber of the adjacent module, thereby separating the matrix and breaking out the module for a distance depending upon how far the tube is driven into the matrix material. The tube, being only slightly more rigid than the matrix, is capable of separating the matrix, but is not sufficiently hard or rigid to nick or otherwise damage the optical fibers or their outer coating adjacent the cut. In the field, an installer may have several such break-out tools in his tool kit, of varying diameters, thereby making it possible to break out any number of fibers or modules without the risk of damage thereto. Another tool that has proved useful in breaking out modules from the ribbon and fibers from the modules comprises a C-shaped member, preferably of plastic and having a handle, with one or more fiber threads stretched between the ends of the arms of the C-shape. The threads, made of a suitable strong, flexible, synthetic material are capable of cutting through the matrix material without damaging the optical fibers.

With a module thus broken out from the ribbon, whether at the end thereof or intermediate the ends, the next step is to break out the individual fibers from the module, One method for accomplishing this with the ribbon of the invention, comprising the materials discussed in the foregoing, is to swab with, or otherwise apply to the matrix material, an expanding material. With the matrix material such as specified in the aforementioned Jackson et al. patent, it has been found that a solution of approximately seventy percent (70%) by volume of ethyl alcohol will cause the matrix material to swell sufficiently to break the bond between it and the fiber color layer. With the matrix thus treated, that portion of the module, or fibers, is placed upon an adhesive surface and then pulled off, with the result that the matrix material remains adhered to the adhesive, and the coated fibers are freed therefrom, cleared of matrix material. This method is particularly useful at the ribbon end, however, it can also be used on portions of the ribbon intermediate the ends. In an alternate embodiment, a suitable pad, such as burlap cloth, may be used to wipe the debonded matrix from the fibers.

A similar method for separating the matrix material from the fiber, which is especially useful for regions intermediate the ends of the ribbon comprises placing a piece of suitable adhesive tape along the region of the ribbon where separation is desired, coating the matrix material on the side of the ribbon opposite the tape with the cyanoacrylate ester material (Krazy Glue®), pressing the glued side against a plate of textured or sandblasted polycarbonate or other suitable material, and, after the glue sets, pulling the adhesive tape away, and then pulling the ribbon away. Only the matrix remains adhered to the plate, thus the fibers are cleanly separated from the matrix material.

The methods discussed in the foregoing are especially useful in that they can readily be used or performed in the field or in the factory, and do not require either complex tools, hazardous materials, or complex operations and can even be performed manually if necessary.

The present invention also relates to a process for identifying individual fibers within an optical ribbon, wherein the ribbon includes a plurality of substantially parallel longitudinally extending optical fibers disposed in a side-by-side array. The optical fiber ribbon includes the fibers arrayed in modules comprising a plurality of the adjacent fibers of a number less than the total number of fibers in the ribbon. Specifically, the identification process includes a first step of applying a first identifier means to each fiber in its module for discretely and uniquely identifying each fiber in the module to the exclusion of other fibers in the module. A second step in the inventive process includes applying second identifier means to each module for discretely identifying each of the modules within the ribbon to the exclusion of other modules within the ribbon. The second identifier means may comprise a coded marking on at least one surface of the module being identified. In this manner, the process exclusively identifies each individual fiber in the ribbon by a combination of the first and second identifier means. The first identifier means may include, but is not limited to, coloring each of the fibers contained in the module, wherein the color on any fiber within a module is different from the color of every other fiber within the module, thereby forming a sequence of colored fibers within a particular module.

These and other features of the present invention will be more readily apparent from the following detailed description, read in conjunction with the accompanying drawings.

DESCRIPTION OF THE DRAWINGS

FIG. 2 is a perspective view of a break-out tool for use with the ribbon of FIG. 1;

FIG. 3 is an end view of a ribbon of the invention and of the break-out tool of FIG. 2;

FIG. 4 is a partial sectional view of an end of the tool of FIG. 2;

FIG. 5 is a view of an alternative break-out tool for use with the ribbon structure of FIG. 1;

DETAILED DESCRIPTION

Figure 1:
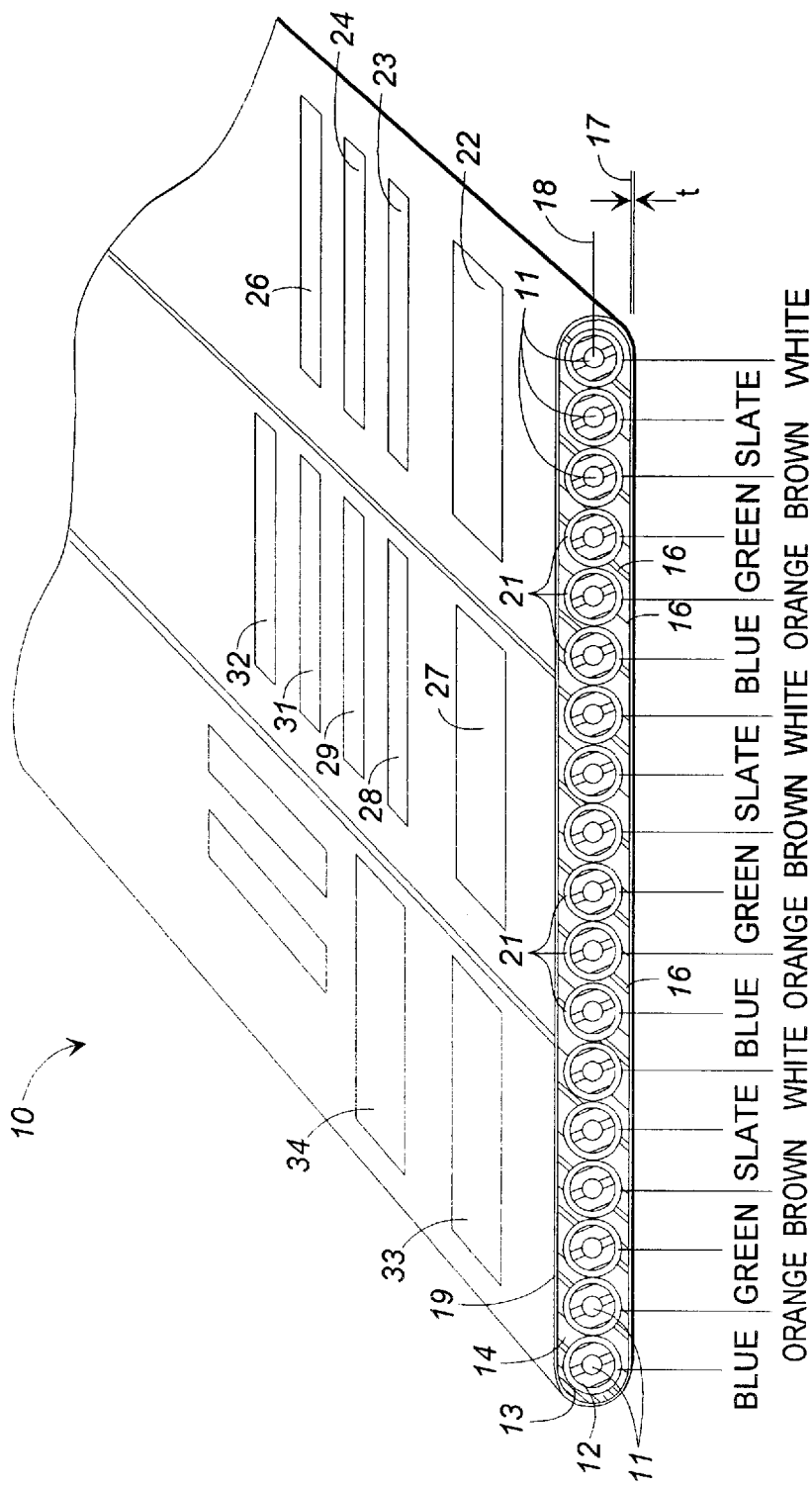
FIG. 1 is a perspective view of an optical fiber ribbon embodying the present invention.

In FIG. 1 there is shown a perspective view of the ribbon 10 of the present invention, which comprises a bonded optical fiber coplanar array of eighteen fibers 11,11. Each fiber 11, which is approximately 125 microns ($\mu$) in diameter is enclosed in inner 12, and outer 13, layers of coating materials and is provided with a color identifier, which will be discussed hereinafter. The inner layer 12 comprises an ultraviolet curable bonding material having a modulus of approximately 1 MPa and outer layer 13 is an ultra-violet curable bonding material having a modulus in the range of about 1 GPa. The fibers 11 of the ribbon 10 are held together in a matrix bonding material 14 which bonds adjacent fibers in the array together.

When the optical fibers are disposed in a parallel array, as shown in FIG. 1, interstices 16,16 are created between the fibers, also as shown in FIG. 1. The matrix bonding material 14 fills these interstices and extends outwardly on each major side of the array to a plane 17 which is parallel to a plane 18 which is defined by the longitudinal axes of the fibers 11,11 and which is tangent to the outer diameter of the encased fibers. The matrix material 14 preferably extends beyond the plane 17 to form a complete cover 19 for the array which has a thickness "t". The thickness "t" of the cover 19 between the outermost portion of the surface of the encased fibers and the outer surface of the cover 19 may have any number of values, ranging from approximately zero to several microns ($\mu$m). It has been found that a thickness "t" of approximately fifteen (15) to thirty-five (35) $\mu$m is adequate for most purposes.

The matrix bonding material 14 preferably has a modulus which falls between the moduli of the inner 12 and the outer 13 layers of coating material on the dual coated fiber. As a consequence, the matrix material 14 is preferably a UV curable bonding material having a modulus which is greater than about 1 MPa but which is less than 1 GPa. The modulus must be sufficiently high to provide suitable mechanical integrity, but it cannot be so high as to affect adversely the loss performance of the optical fiber or access to the fiber by a craftsperson for splicing purposes, for example. The bonding material must hold the optical fibers together but, at the same time, allow for some minute interfiber movement. The matrix material is preferably UV curable, but a thermally curable material such as a polyimide based material or any other material having a thermally induced condensation polymerization will also suffice. In the aforementioned U.S. Pat. No. 4,900,126, there are given examples of typical UV curable bonding materials for use with the ribbon structure 10.

The bonded ribbon structure 10 of the present invention has several advantages over other types of ribbon structures. Because of its thickness and the modulus, the matrix bonding material 14 permits minute interfiber movement of the fibers 11 while functioning to hold them together in a ribbon structure and does not adversely affect the environment performance of the fibers 11. The geometry of the bonding material likewise prevents nesting of several ribbons when stacked together. Nesting is undesirable because it hinders individual transverse ribbon mobility in a stack of ribbons and can result in microbending losses or possible breakage of fibers within the ribbon.

In order that a craftsperson may readily identify the individual fibers, they are color coded by means of a thin layer 21 of coloring material on the surface of the outermost coating layer 13 of each fiber. Alternatively, the layer 13 may have a colorant incorporated therein. It is highly desirable, if not absolutely necessary, that the coloring layer not be removed or otherwise obscured where the bonding material 14 is removed to gain access to the fibers. The matrix material 14 of the ribbon 10 and the surface of the color identifier of the invention thus is preferably selected to have an interfacial bonding characteristic such that the bonded interface of the matrix material 14 and the colorant material 21 (or the colored outer layer 13) is weaker than the bonding interface of the colorant material 21 to the coating on the optical fiber. Such a desideratum can be achieved, for example, by the application of a release agent, not shown, to the outermost surface of the coated fiber prior to the application of the bonding material to the array of fibers. Alternatively, the release agent can be incorporated in the colorant material. The release agent creates a weak boundary layer at the interface of the colorant material and the matrix bonding material. The release agent can also facilitate the separating out of individual fibers from the bonding material for splicing purposes.

In FIG. 1 there is shown a ribbon 10 having eighteen individual coated fibers 11 arrayed in side-by-side relationship, and divided into three groups of six fibers each, as shown by the dashed lines. The individual fibers in each group are color coded, as shown, with the color code sequence being repeated from group to group. It is to be understood that other ribbon arrangements might be used, such as, for example. twenty-four fibers arranged in six groups of four fibers each. It has been found that, for example, eighteen fiber ribbons of sixteen fibers per ribbon may be stacked within a standard size 0.6 inch sheath, thereby creating a cable containing two hundred and eighty-eight individual fibers instead of the present day two hundred and sixteen fibers. Where feasible, the core tube diameter may be increased sufficiently to accommodate twenty-four ribbons of sixteen fibers each, for example, thus increasing the capacity to three hundred and sixty (360) fibers within a single core tube. Obviously, while a high fiber density cable is realized, the problem of identifying unambiguously each individual fiber is tremendous. Heretofore, in the prior art, it has been the practice to print or otherwise mark the top surface of the ribbon with identifying markers, most often alphanumeric characters which are inked on the surface as the ribbon passes during the final phases of manufacture. Thus, a three group ribbon, as shown in FIG. 1 would have transversely spaced numerals 8, 9 and 10, for example, printed at spaced intervals along the length of the ribbon. At present day production speeds, where the ribbon moves past a given point at approximately three hundred feet per minute (300 fpm), it has proven to be extremely difficult to stamp alphanumeric figures and have them remain legible. Almost invariably there is smearing of the marking ink to the extent that ready identification of a particular group is quite difficult. Also, on small fiber count, e.g., fiber modules, the identifying characters are too small for complete legibility.

The ribbon of the present invention, as shown in FIG. 1, has marked on the flat surface thereof a coded identifying arrangement such as a digital numerical arrangement. As shown in FIG. 1, there are three side-by-side groups of fibers, each group having six fibers. With the novel marking arrangement of the present invention, the first group of the ribbon 10, i.e., the group of six fibers on the right hand side as viewed in FIG. 1 is marked with a broad transverse band 22 and three narrow, spaced bands 23, 24 and 26. The broad band 22 represents the numeral five (5) and each of the narrow bands represents one (1). Thus, the group has an identifying number of eight. The width of the broad band 22, as well as the spacing between bands is such that even in the event of smearing, there is no overlay, nor do the narrow bands smear to the extent that they can be mistaken for broad bands. For example, all of the bands may be spaced from each other a distance that is greater than the width of a broad band. Such a digital or bar-code arrangement maintains complete legibility at production speeds not only of 300 ft/min., but also at much greater speeds. Thus, as is currently being contemplated, speeds of 300 m/min. will not impair the legibility, nor will the legibility of small fiber counter modules be impaired, whereas with alpha numeric numbers, legibility would be greatly impaired if not destroyed. In like manner, the second group of six fibers has a broad bar 27 and four narrow bars 28, 29, 31, and 32, thereby designating this group of number nine (9), and the third group has two broad bars 33 and 34, identifying group number ten (10). In each case, the longitudinal spacing of the bars, both broad and narrow, is such that there is no overlap resulting from smearing at high production speeds. It is to be understood that the bar code arrangement of FIG. 1 can be adapted for any number of groups or modules of fibers in the ribbon. Where the number of fibers in a module is small, such as, for example, two (2), some confusion could result from the large number of digital identifiers extending transversely of the ribbon and being quite close together. Such confusion can be obviated by longitudinally staggering or offsetting the bars from adjacent bars.

It is to be understood that other bar code arrangements might be used. However, that shown in FIG. 1 is both simple and reliable and, for the present application, preferred. It is not necessary that only the numbers five and one be represented by the bars; however. Where there is a large number of groups, the number ten can be represented by, for example, an even wider bar.

From the foregoing, it can readily be seen that each fiber in the ribbon 10 has its own unique designation, thereby greatly facilitating the craftsperson's ability to isolate individual fibers or groups of fibers. Thus, as viewed in FIG. 1, the ninth fiber from the left hand edge of the ribbon is designated as 9-green, while the sixteenth fiber, for example, is 8-brown, the fifth fiber is 10-slate, the seven is 9-blue, and so forth, As a consequence, any particular fiber in the entire stack of ribbons, where the modules or groups in each ribbon are numbered differently, can be readily found by the craftsperson. The problem then becomes the isolation or breaking out of a particular module or group from the stack and from the ribbon in which it is located. The arrangement of FIG. 1 is shown for purposes of illustrating the principles of the invention. Various other numerical designations (all even numbers, odd numbers, or a coded sequence of numbers) might readily be used and will fall within the scope of the invention.

Heretofore, breaking out of one or more fibers or modules from a ribbon has been by means of a cutting tool, such as a razor blade, which cuts the matrix material between adjacent fibers. Such an operation is not entirely satisfactory, however, inasmuch as the straight sharp, hard edge of the cutting tool can, and often does, nick or otherwise damage the fiber coating or the fiber itself. In extreme cases, the fiber can be rendered useless, and is less extreme cases the transmission qualities can be impaired. In addition, nicks can lead to subsequent breakage of the fiber when under physical stress from handling, for example. In FIG. 2 there is shown a break-out tool for use with the ribbon fiber of FIG. 1. Break-out tool 36 comprises a hollow tube of circular cross-section having an inside diameter approximately equal to the transverse dimension of the array of fibers that it is desired to break out. Thus, where the module or group comprises six fibers, the I.D. of the tube is equal to the transverse dimensions of the array of six fibers as shown in FIG. 3. The tube 36 is preferably of a suitable plastic material such as polyolefin, polyethylene, or Teflon® for example, and has a modulus (or hardness) greater than that of the matrix material 14 but less than that of the fiber coating 13. As a consequence, when the tube 36 is applied to the end of the ribbon 10, as shown in FIG. 3, and pressure is applied, the tube separates the matrix 14, thereby separating the group of the ribbon 10. In like manner, the middle group can be separated out. As shown in dashed lines in FIG. 3, tube 36 can be made larger to encompass and separate a larger number of fibers, or it can be made smaller to break out fewer fibers. The separating of the matrix material can be facilitated by the fabrication of a bevel 37 on the end of the tube 36, as shown in FIG. 4. Because the material of the tube has a modulus that is less than the modulus of the material of the fiber coating, it will not cut or nick that coating in use, hence, the integrity of the coated fibers is maintained. It can be appreciated that a craftsperson can have a number of break-out tools 36 of varying sizes in his tool kit, thereby being equipped to break out; however, many fibers may be desired for any particular application. The break-out can be several kilometers long and can be incorporated into the cable manufacturing process, or it can involve only short lengths for purposes of, for example, splicing a few fibers. This type of tool is particularly useful for separating fibers mid-span without inducing excess loss during the separation process.

In FIG. 5, there is shown another type of breaking out tool 38 which comprises a handle 39 preferably of plastic and first and second outwardly extending spaced arms 41 and 42 forming a C-shaped opening. Between the distal ends of the arms 41 and 42 is strung one or more filaments 43 of a suitable material such as, for example, a polyester or a polyolefin or Gore-Tex®, which is stretched between and affixed to the ends of the arms 41 and 42. The filamentary material 43 is such that it can move through the matrix material 14, but will not cut, but rather will conform to, the outer coating 13 on the optical fiber thereby leaving it intact. Thus, the craftsperson is equipped to break out any number of fibers from the ribbon by means of a single tool 38. It should be obvious that the tool 38 can be oriented relative to the ribbon 10 as shown, or it may be oriented at right angles thereto to separate the matrix between adjacent fibers.

Figure 6:
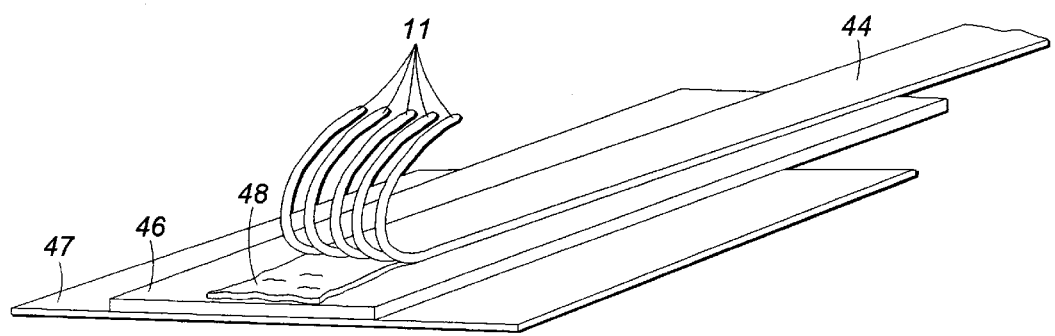
FIG. 6 is a perspective view of one step in a method in accordance with the invention for separating the optical fibers of the ribbon of FIG. 1 from the matrix material thereof.

Once the desired group of fibers has been broken out from the ribbon, it becomes necessary to remove the matrix material 14 in order to have clear access to the fiber itself. In FIG. 6 there is shown a representation of one preferred method of separating the coated fibers 11 from the matrix material 14 after the fibers have been broken out from the ribbon 10. As shown in FIG. 6, that portion 44 of the ribbon 10, containing, for example, five fibers 11 is first treated, as by swabbing, with an expanding solution which may be, for example, a solution of approximately seventy percent (70%) by volume of ethyl alcohol. With the matrix material disclosed in the aforementioned U.S. Pat. No. 4,900,126 of Jackson et al., the solution causes the matrix material to swell sufficiently to break the bond between it and the outermost coating layer 13 of the fibers. That portion of the ribbon 44 thus treated, which is shown in FIG. 6 at the end thereof, but which can be a portion intermediate the ends is then placed upon and affixed to an adhesive surface 46 which may be, for example, a double-sided tape mounted on a suitable flat surface 47. The matrix material 14 adheres to the surface 46 so that the fibers 11 may simply be peeled off, leaving a matrix residue 48. The fibers are then substantially completely free of any foreign or extraneous material, e.g., the matrix, and are in condition for further operation thereon such as coupling, splicing, or the like.

Figure 7:
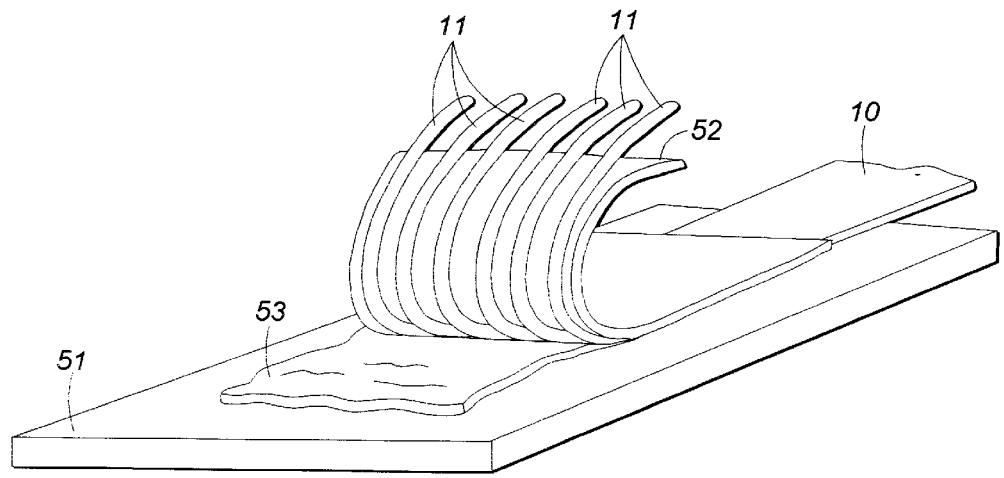
FIG. 7 is a perspective view of steps in an alternative method for separating the optical fiber from the matrix material.

A somewhat similar arrangement for separating the fiber from the matrix material which is especially useful for regions intermediate the ends of the ribbon is shown in FIG. 7. Although FIG. 7 is a depiction of the end of the ribbon, it is to be understood that the method of FIG. 7 is of use in breaking out and treating the fiber substantially anywhere along the length of the ribbon. The arrangement of FIG. 7 comprises a flat surface member 51 which may be, for example, a plate of sandblasted or otherwise textured polycarbonate. An adhesive tape 52 is affixed to the ribbon 10 on one surface, i.e., the top surface, thereof, and the bottom surface is coated with a coating of cyanoacrylate ester material, e.g., Krazy Glue®. The ribbon thus coated is pressed against the surface 51 until the glue sets, which happens quite rapidly, and then the tape 52 is peeled off, as shown in FIG. 7, and then the ribbon containing the fibers is peeled off. The tape 52 serves to protect the operator from the extremely adhesive glue. the fibers 11 with it and leaving the matrix residue 53 behind. The fibers 11 thus broken out are thus substantially free of any matrix or other material and are amenable to the performance of the desired operations thereon, e.g., splicing, connecting or further separating into single fibers or modules using the foregoing methods.

The unique modular construction of the optical fiber ribbon of the invention, together with the unique simple, and reliable fiber identification system, enables a craftsperson or other operator to go immediately to the desired fiber or group of fibers and to break it out without danger of picking the wrong fiber or group resulting from illegibility of identifying numbers, for example. Large numbers of fiber ribbons may be stacked within the fiber cable without impairing in any way the integrity of the fiber or fiber groups and cabling and fiber access are greatly simplified when the ribbon has the modular construction of the present invention.

It is to be understood that the foregoing is by way of illustrating the principals and features of the present invention, and that various changes or modifications may occur to workers in the art without departure from the spirit and scope of the invention.

We claim:

1. An optical fiber ribbon comprising a plurality of longitudinally extending optical fibers disposed in a side-by-side array with the longitudinal axes thereof being substantially parallel to one another, each of said fibers having at least one layer of coating material thereon;

a curable matrix bonding material surrounding and enveloping said array and filling the interstices between adjacent fibers, the modulus of said matrix bonding material and its bonding to each of said fibers being such as to hold together said array while allowing interfiber movement, wherein said side-by-side array includes substantially flat top and bottom ribbon surfaces;

first identifier means for dividing said array of fibers into discrete identified modules, each module comprising a plurality of adjacent fibers of a number less than the total number of fibers in said array, said first identifier means discretely identifying each fiber in the module to the exclusion of the other fibers in said module; and second identifier means for discretely identifying each of said modules to the exclusion of the other modules in said ribbon, said second identifier means comprising a coded marking only on at least one of said top and bottom ribbon surfaces over the module being identified, wherein said second identifier means comprises one or more transversely extending marked bars longitudinally spaced from each other, each of said bars having a width indicative of a discrete number;

wherein said ribbon includes a separate second identifier means for each said module in said ribbon.

2. The optical fiber ribbon as claimed in claim 1 wherein the longitudinal spacing between transverse bars is greater than the width of the widest of said bars.

3. The optical fiber ribbon as claimed in claim 1 wherein a narrow bar indicates the number one and a wide bar indicates the number 5.

4. The optical fiber ribbon as claimed in claim 1 wherein the marked bars for one modules are longitudinally offset from the marked bars for another adjacent module.

5. The optical fiber ribbon as claimed in claim 1 wherein said first identifier means comprises a visible colorant on each of said fibers contained in a module, the color of the colorant on any fiber within the module being different from the color of the colorant on every other fiber within the module thereby forming a sequence of colored fibers within the module.

6. An optical fiber ribbon as claimed in claim 5 wherein the sequence of colored fibers is repetitive from module to module.

7. A process for identifying individual fibers within an optical fiber ribbon, wherein the ribbon includes a plurality of longitudinally extending optical fibers disposed in a side-by-side array with the longitudinal axes thereof being substantially parallel to one another, a curable matrix material surrounding and enveloping the array and filling interstices between adjacent fibers, the fibers being arrayed in modules comprising groups of fibers, and each module comprising a plurality of adjacent fibers of a number less than the total number of fibers in the array, and wherein the ribbon includes top and bottom substantially flat surfaces, the process comprising the steps of:

applying first identifier means to each fiber in its module for discretely and uniquely identifying each fiber in the module to the exclusion of the other fibers in the module; and applying second identifier means to each module for discretely identifying each of the modules to the exclusion of the other modules in the ribbon, the second identifier means comprising a coded marking only on at least one of the top and bottom surfaces over the module being identified, thereby exclusively identifying each individual fiber in the ribbon by a combination of said first and second identifier means, wherein the coded marking includes one or more transversely extending bars on the module, wherein the bars are longitudinally spaced from each other on the module, and each of the bars include a width indicative of a discrete number;

wherein said ribbon includes a separate second identifier means for each module in said ribbon.

8. The process as claimed in claim 7 comprising the further step of:

longitudinally spacing the adjacent transverse bars at a distance which is greater than the width of the widest of the bars.

9. The optical fiber ribbon as claimed in claim 7 comprising the further steps of:

designating a narrow bar to indicate the number one; and designating a wide bar to indicate the number five.

10. The process as claimed in claim 7 comprising the further step of:

longitudinally offsetting marked bars on one module from the marked bars on another adjacent module.

11. The process as claimed in claim 7 wherein the fiber identifying step comprises the further step of:

coloring each of the fibers contained in a module, wherein the color on any fiber within a module is different from the color of every other fiber within the module, thereby forming a sequence of colored fibers within said module.

12. The process as claimed in claim 11 comprising the further step of:

repeating the sequence of colored fibers from module to module.

13. The process as claimed in claim 7 further comprising the step of:

marking the ribbon at a production speed of at least approximately three hundred feet per minute (300 fpm).

14. An optical fiber ribbon comprising:

a plurality of longitudinally extending optical fibers disposed in a side-by-side configuration with the longitudinal axes thereof being substantially parallel to one another;

a curable matrix bonding material surrounding and enveloping said array and filling the interstices between adjacent fibers, a modulus of the matrix bonding material and its bonding to each of said fibers configured to hold together said array while allowing interfiber movement, wherein said side-by-side array includes substantially flat top and bottom ribbon surfaces;

first identifier means for dividing said ribbon into discrete modules, each module comprising a plurality of adjacent fibers of a number less than the total number of fibers in said array, said first identifier means comprising a visible colorant on each of the fibers contained in a module, the color of the colorant on any fiber within a module being different from the color of the colorant on every other fiber within the module, thereby forming a sequence of colored fibers within said module and discretely identifying each fiber in said module to the exclusion of the other fibers in said module; and second identifier means for discretely identifying each of said modules to the exclusion of the other modules in said ribbon, said second identifier means comprising sets of one or more transversely extending marked bars, wherein bars in each said set are longitudinally spaced from each other, each of said bars having a width indicative of a discrete number, wherein each said set of bars is are disposed on one of said top and bottom surfaces over the module being identified;

wherein said ribbon includes a separate set of marked bars for each module in said ribbon, thereby exclusively identifying each individual fiber in said ribbon by a combination of said first and second identifier means.

* * * * *